United States Patent
Chakraborty et al.

(10) Patent No.: US 9,674,769 B2
(45) Date of Patent: Jun. 6, 2017

(54) UE BEACONING USING RACH TRANSMISSIONS FOR SMALL CELLS

(71) Applicant: QUALCOMM Incorporated, San Diego, CA (US)

(72) Inventors: Kaushik Chakraborty, San Diego, CA (US); Bongyong Song, San Diego, CA (US); Soumya Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 13/734,952

(22) Filed: Jan. 5, 2013

(65) Prior Publication Data

US 2014/0192690 A1    Jul. 10, 2014

(51) Int. Cl.
   | | |
   |---|---|
   | H04W 48/16 | (2009.01) |
   | H04L 5/00 | (2006.01) |
   | H04W 52/02 | (2009.01) |
   | H04W 84/04 | (2009.01) |

(52) U.S. Cl.
   CPC .......... *H04W 48/16* (2013.01); *H04L 5/0053* (2013.01); *H04W 52/0206* (2013.01); *H04W 84/045* (2013.01); *Y02B 60/50* (2013.01)

(58) Field of Classification Search
   CPC ..... H04W 48/16; H04W 52/02; H04W 56/00; H04W 52/04; H04B 7/00
   USPC ........... 370/311, 328–331; 455/403, 522, 68, 455/561
   See application file for complete search history.

(56) References Cited

U.S. PATENT DOCUMENTS

| | | | |
|---|---|---|---|
| 7,864,742 B2 | 1/2011 | Bennett | |
| 2006/0252377 A1* | 11/2006 | Jeong | H04W 24/10 455/67.13 |
| 2008/0285670 A1 | 11/2008 | Walton et al. | |
| 2011/0076964 A1* | 3/2011 | Dottling et al. | 455/68 |

(Continued)

FOREIGN PATENT DOCUMENTS

| | | | |
|---|---|---|---|
| EP | 2184939 A1 | 5/2010 | |
| WO | WO-2009140988 A1 | 11/2009 | |

(Continued)

OTHER PUBLICATIONS

International Search Report and Written Opinion—PCT/US2013/077047—ISA/EPO—Jun. 2, 2014.

(Continued)

*Primary Examiner* — Charles C Jiang
*Assistant Examiner* — Wali Butt
(74) *Attorney, Agent, or Firm* — Bala Ramasamy

(57) ABSTRACT

A method of beacon detection performed by a small cell device includes: exchanging beacon parameters with a user equipment (UE); entering a low power mode after exchanging the beacon parameters with the UE; receiving, from the UE, a beacon in a random access channel (RACH) preamble containing the beacon parameters while in the low power mode; entering a high power mode in response to receiving the beacon; and associating with the UE while in the high power mode. The method of beacon detection allows a small cell device to transition from a low power mode to a high power mode in an efficient manner. The transmission may be triggered by a user equipment that is entering a service area of the small cell device.

47 Claims, 12 Drawing Sheets

(56) References Cited

U.S. PATENT DOCUMENTS

| | | |
|---|---|---|
| 2011/0128865 A1 | 6/2011 | Doppler et al. |
| 2011/0149885 A1* | 6/2011 | Bachu ................. H04W 74/008 370/329 |
| 2011/0305180 A1* | 12/2011 | Osterling .......... H04W 52/0206 370/311 |
| 2012/0149422 A1* | 6/2012 | Ye et al. ........................ 455/522 |
| 2012/0176951 A1* | 7/2012 | Pradas ................ H04W 74/006 370/312 |
| 2012/0178454 A1 | 7/2012 | Kim et al. |
| 2012/0182965 A1 | 7/2012 | Das et al. |
| 2012/0289178 A1* | 11/2012 | Matsumura et al. ......... 455/403 |
| 2012/0300686 A1* | 11/2012 | Maeda et al. ................. 370/311 |
| 2013/0028157 A1* | 1/2013 | Ruster et al. ................. 370/311 |
| 2013/0288658 A1* | 10/2013 | Duan ................ H04W 52/0206 455/418 |
| 2014/0003317 A1* | 1/2014 | Breitbach ............. H04W 52/02 370/311 |

FOREIGN PATENT DOCUMENTS

| | | |
|---|---|---|
| WO | WO-2010151186 A1 | 12/2010 |
| WO | WO 2012089162 A1 * | 7/2012 ........ H04W 52/0206 |
| WO | WO-2012093088 A1 | 7/2012 |

OTHER PUBLICATIONS

Partial International Search Report—PCT/US2013/077047—ISA/EPO—Jan. 19, 2015.

* cited by examiner

UE BEACONING USING RACH TRANSMISSIONS FOR SMALL CELLS

BACKGROUND

1. Field

The disclosure relates generally to wireless systems and methods, and, in particular, to systems and methods for beacon detection.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long-term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more access points via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

To supplement conventional access points, additional restricted access points can be deployed to provide more robust wireless coverage to mobile devices. For example, wireless relay stations and low power access points (e.g., which can be commonly referred to as Home NodeBs or Home eNBs, collectively referred to as H(e)NBs, femto access points, femtocells, picocells, microcells, etc.) can be deployed for incremental capacity growth, richer user experience, in-building or other specific geographic coverage, and/or the like. In some configurations, such low power access points can be connected to the Internet via broadband connection (e.g., digital subscriber line (DSL) router, cable or other modem, etc.), which can provide the back haul link to the mobile operator's network. Thus, for example, the low power access points can be deployed in user homes or enterprise environment to provide mobile network access to one or more devices via the broadband connection.

In such heterogeneous networks, it is often challenging for a mobile device and a nearby access point, such as a small cell, to detect each other. One challenge lies in that there is an incentive for the small cell to remain in power-save mode for extended periods when there are no mobile devices in the coverage area of the small cell. Detection, and therefore communication, between the devices (e.g., when the mobile device returns to the coverage area) is limited while the small cell is in the power-save mode. One prior solution is for the small cell to transmit low-power beacons so that the mobile device can detect the presence of the small cell in power-save mode.

SUMMARY

A method of beacon detection performed by a small cell device includes, but is not limited to, any one or combination of: (i) exchanging beacon parameters with a user equipment (UE); (ii) entering a low power mode after exchanging the beacon parameters with the UE; (iii) receiving, from the UE, a beacon in a random access channel (RACH) preamble containing the beacon parameters while in the low power mode; (iv) entering a high power mode in response to receiving the beacon; and (v) associating with the UE while in the high power mode.

In various embodiments, the beacon parameters are exchanged with the user equipment while in the high power mode.

In various embodiments, in the low power mode, a listening component of the small cell device for receiving the beacon is activated and a transceiver of the small cell device for receiving data packets is deactivated. In the high power mode, the listening component of the small cell device is activated and the transceiver of the small cell device is activated.

In various embodiments, the small cell device enters the low power mode when the UE is not in coverage of the small cell device.

In various embodiments, the small cell device is a femtocell unit.

In various embodiments, the associating comprises performing a subsequent RACH procedure to complete cell reselection.

A method of beacon transmission performed by a user equipment includes, but is not limited to, any one or combination of: (i) exchanging beacon parameters with a small cell device; (ii) detecting presence of the small cell device; (iii) transmitting, in response to the detecting, a beacon in a random access channel (RACH) preamble containing the beacon parameters to the small cell device; and (iv) associating with the small cell device.

In various embodiments, the presence of the small cell device is detected while the small cell device is in a low power mode. The parameters are exchanged with the user equipment while the small cell device is a high power mode. The user equipment is associated with the small cell device while the small cell device is in the high power mode.

In various embodiments, the associating comprises performing a subsequent RACH procedure to complete cell reselection.

In various embodiments, the presence of the small cell device is detected via at least one of a neighborhood map, out-of-band signaling, and position estimation.

A method of beacon detection performed by a small cell device includes, but is not limited to, any one or combination of: (i) exchanging beacon parameters with a user equipment (UE); (ii) transmitting the beacon parameters to a neighboring cell device; (iii) entering a low power mode after exchanging the beacon parameters with the UE; (iv) receiving a notification from the neighboring cell device in response to the neighboring cell receiving, from the UE, a beacon in a random access channel (RACH) preamble containing the beacon parameters while in the low power mode; (v) entering a high power mode in response to receiving the notification; and (vi) associating with the UE while in the high power mode.

In various embodiments, the neighboring cell device comprises a small cell device.

In various embodiments, the neighboring cell device comprises a macro cell device.

In various embodiments, the notification is received via a backhaul to the small cell device.

In various embodiments, the beacon parameters are exchanged with the UE while in the high power mode.

In various embodiments, in the low power mode, a listening component of the small cell device for receiving the notification is activated and a transceiver of the small cell device for receiving data packets is deactivated. In the high power mode, the listening component of the small cell device is activated and the transceiver of the small cell device is activated.

In various embodiments, the small cell device enters the low power mode when the UE is not in coverage of the small cell device.

In various embodiments, the small cell device is a femtocell unit.

In various embodiments, the associating comprises performing a subsequent RACH procedure to complete cell reselection.

A method of beacon transmission performed by a user equipment includes, but is not limited to, any one or combination of: (i) exchanging beacon parameters with a small cell device; (ii) detecting presence of the neighboring cell device associated with the small cell device; (iii) transmitting, in response to the detecting, a beacon in a random access channel (RACH) preamble containing the beacon parameters to the neighboring cell device; and (iv) associating with the small cell device.

In various embodiments, the presence of the neighboring cell device is detected while the small cell device is in a low power mode. The parameters are exchanged with the user equipment while the small cell device is a high power mode. The user equipment is associated with the small cell device while the small cell device is in the high power mode.

In various embodiments, the associating comprises performing a subsequent RACH procedure to complete cell reselection.

In various embodiments, the presence of the small cell device is detected via at least one of a neighborhood map, out-of-band signaling, and position estimation.

A method of beacon detection performed by a small cell device includes, but is not limited to, any one or combination of: exchanging beacon parameters with a user equipment (UE); transmitting the beacon parameters to a first neighboring cell device; entering a low power mode after exchanging the beacon parameters with the UE; receiving, while in the low power mode, at least one of (i) a beacon in a random access channel (RACH) message containing an identifier of the small cell, and (ii) a notification from the first neighboring cell device in response to the neighboring cell device detecting a beacon in a RACH message from the UE containing an identifier of the small cell device; entering a high power mode in response to receiving the second notification; and associating with the UE while in the high power mode.

In various embodiments, the RACH message includes an identifier for the small cell device.

In some embodiments, the identifier comprises a SRNC-ID.

In various embodiments, the notification is received from the neighboring cell device to which the UE transmitted the RACH message.

In various embodiments, the notification is received from a different neighboring cell device to which the UE transmitted the RACH message.

In various embodiments, the at least one of the neighboring cell devices comprises a small cell device.

In various embodiments, the at least one of the neighboring cell devices comprises a macro cell device.

In various embodiments, the notification is received via a backhaul to the small cell device.

In various embodiments, the high power mode uses more power than the low power mode.

In various embodiments, the beacon parameters are exchanged with the UE while in the high power mode.

A method of beacon detection transmission by a user equipment includes, but is not limited to, any one or combination of: (i) exchanging beacon parameters with a small cell device; (ii) detecting presence of a neighboring cell device; (iii) transmitting, in response to detecting the neighboring cell device, a beacon in a random access channel (RACH) message containing the beacon parameters; and (iv) associating with the small cell device.

In various embodiments, the RACH message is transmitted to the detected neighboring cell device.

In various embodiments, the RACH message includes an identifier for the small cell device.

In various embodiments, the identifier comprises a serving radio network control identifier (SRNC-ID).

In various embodiments, the presence is detected while the small cell device is in a low power mode. The parameters are exchanged with the user equipment while the small cell device is a high power mode. The user equipment is associated with the small cell device while the small cell device is in the high power mode.

In some embodiments, the high power mode uses more power than the low power mode.

In various embodiments, the associating comprises performing a subsequent RACH procedure to complete cell reselection.

In various embodiments, the presence of the small cell device is detected via at least one of a neighborhood map, out-of-band signaling, and position estimation.

An apparatus for beacon detection includes, but is not limited to, any one or combination of: means for exchanging beacon parameters with a user equipment (UE); means for entering a low power mode after exchanging the beacon parameters with the UE; means for receiving, from the UE, a beacon in a random access channel (RACH) preamble containing the beacon parameters while in the low power mode; means for entering a high power mode in response to receiving the beacon; and means for associating with the UE while in the high power mode.

An apparatus for beacon detection includes, but is not limited to, a processor configured for: exchanging beacon parameters with a user equipment (UE); entering a low power mode after exchanging the beacon parameters with the UE; receiving, from the UE, a beacon in a random access channel (RACH) preamble containing the beacon parameters while in the low power mode; entering a high power mode in response to receiving the beacon; and associating with the UE while in the high power mode.

A computer program product for beacon detection includes, but is not limited to, a computer-readable storage medium comprising code for: exchanging beacon parameters with a user equipment (UE); entering a low power mode after exchanging the beacon parameters with the UE; receiving, from the UE, a beacon in a random access channel (RACH) preamble containing the beacon parameters while in the low power mode; entering a high power mode in response to receiving the beacon; and associating with the UE while in the high power mode.

DETAILED DESCRIPTION

Various embodiments relate to systems and methods for detection of a beacon from a mobile device (user equipment (UE)) by a base station, such as a small cell (e.g., femtocell, picocell, etc.). In particular, systems and methods relate to detecting UE beacons that implement existing RACH preambles and messages. In some embodiments, the UE discovers its proximity to the target small cell. The UE may then transmit a RACH preamble aimed at the target small cell using previously negotiated configuration parameters. The target small cell may detect the preamble and change from a power-save mode to a high-power mode. The UE may subsequently associate with the target cell. In some embodiments, cooperation strategies between neighboring small cells (and optionally neighboring macrocells) may be implemented such that the RACH transmissions from the UE to the target cell may be detected by the neighboring cells. The target small cell may then change its power mode upon being notified by the neighboring small cells. In some embodiments, the UE is configured to send a RACH message to neighboring cells using a cell-specific ID for the target small cell to trigger the power-mode change.

The word "example" or "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal Frequency Division Multiplexing (OFDM) networks, Single-Carrier FDMA (SCFDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR) TD-SCDMA. cdma2000 covers IS-2000, IS-95, and IS-856 standards. A TDMA network may implement a radio technology such as Global System for Mobile Communications (GSM). An OFDM network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an advanced release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

Figure 1:
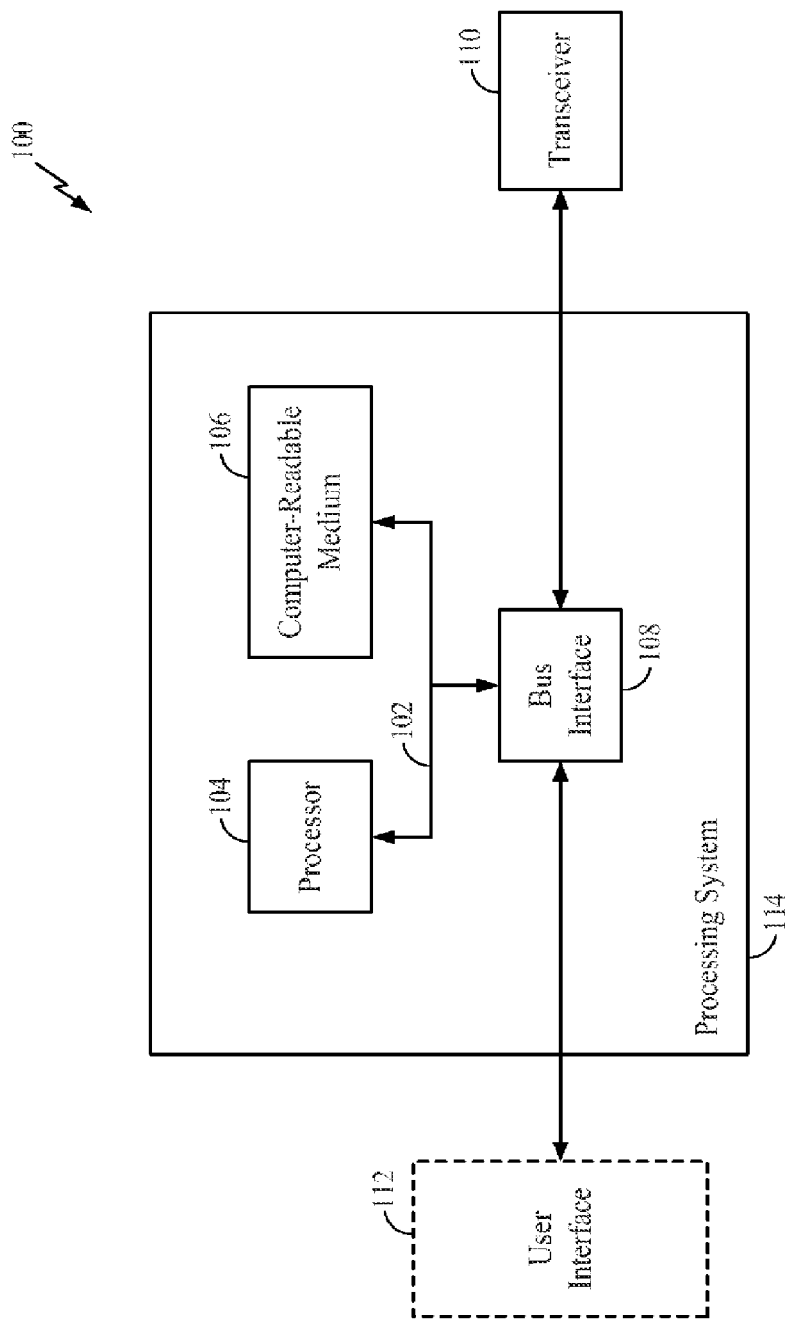
FIG. 1 is a block diagram of an illustrative hardware configuration for an apparatus employing a processing system according to various embodiments of the disclosure.

FIG. 1 is a block diagram of an illustrative hardware configuration for an apparatus 100 employing a processing system 114 according to various embodiments of the disclosure, including (but not limited to) the embodiments of FIGS. 2-7. In this example, the processing system 114 may be implemented with a bus architecture represented generally by bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 allows for communicating with various other apparatus over a transmission medium. Depending upon the nature of the apparatus, a user interface 112 (e.g., keypad, display, speaker, microphone, joystick, etc.) may also be provided.

A processor 104 is responsible for managing the bus 102 and general processing, including the execution of software stored on computer-readable storage medium 106. The software, when executed by the processor 104, causes the processing system 114 to perform the various functions described in the disclosure for any particular apparatus. The computer readable storage medium 106 may also be used for storing data that is manipulated by the processor 104 when executing software.

Figure 2:
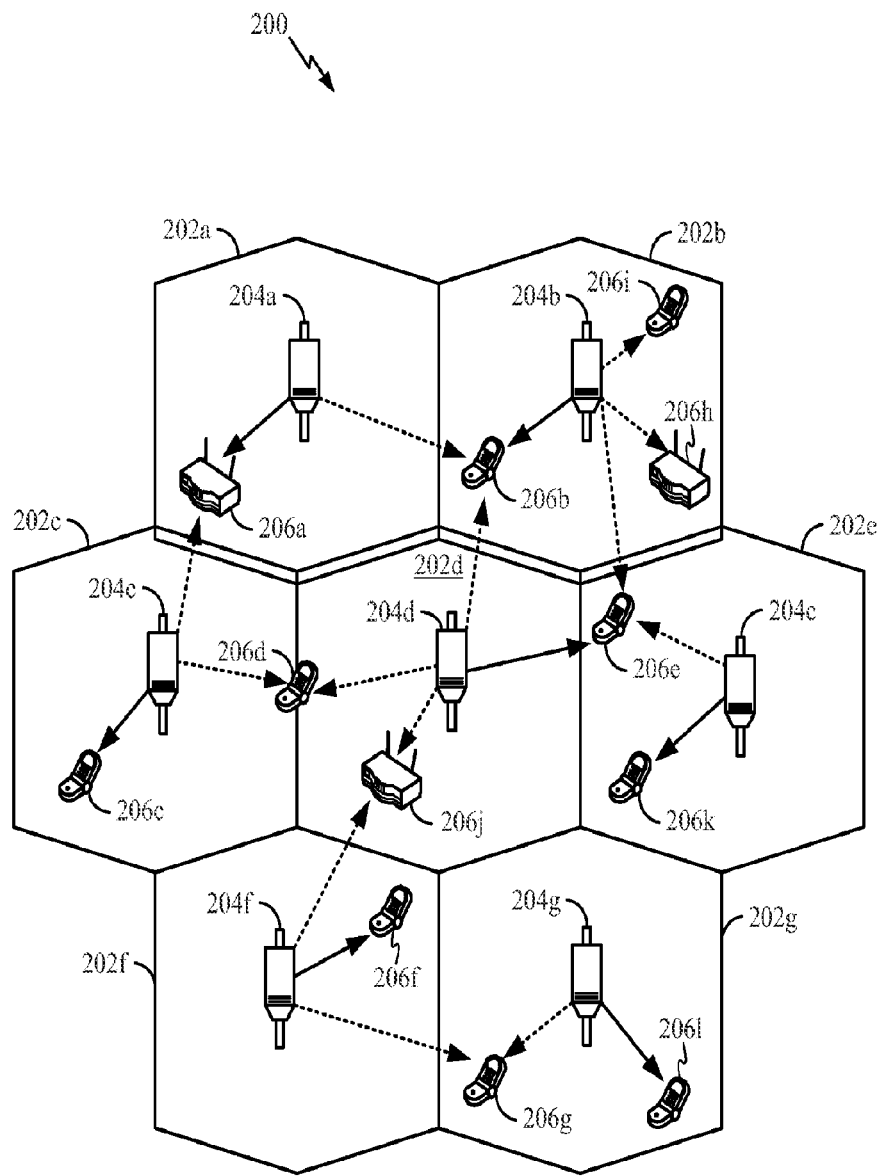
FIG. 2 illustrates a wireless communication system according to various embodiments of the disclosure.

FIG. 2 illustrates a wireless communication system 200 configured to support a number of users according to various exemplary embodiments of the disclosure, including (but not limited to) the embodiments of FIGS. 3A-7. As shown in FIG. 2, by way of example, the system 200 provides communication for multiple cells, such as, for example, macrocells 202a-202g (referred to as macrocell(s) 202), with each macrocell 202 being serviced by a corresponding base station, such as base stations 204a-204g (referred to as base station(s) 204), also known variously as Node Bs (NBs), eNode Bs (eNBs), etc. Each of the macrocells 202 may be further divided into two or more sectors. Each of the base stations 204 may be suitably coupled to a core network (not illustrated), enabling information to be passed between the various base stations 204 and, in some examples, to the Internet. Various mobile stations, including mobile stations 206a-206l (referred to as mobile station(s) 206), also known variously as access terminals (AT), user equipment (UE), etc., are dispersed throughout the system 200. Each of the mobile stations 206 may communicate with one or more base stations 204 on a downlink (DL) and/or an uplink (UL) at a given moment, depending upon whether the base station 206 is active and whether it is in soft handoff, for example. The wireless communication system 200 may provide service over a large geographic region; for example, macrocells 202 may cover a few blocks in a neighborhood. In another example, the macrocells 202 may include or be replaced by smaller cells (i.e., having a smaller geographic service area) such as microcells or picocells. In particular embodiments, the wireless communication system 200 may include femtocells with even smaller and more specific geographic coverage areas.

In general, when a mobile station 206 is switched on, a public land mobile network (PLMN) is selected and the mobile station 206 searches for a suitable cell of this PLMN to camp on. Criteria for cell selection and cell re-selection between radio access technologies (RATs) generally depend on various radio criteria. In addition to the RAT, the PLMN type may differ as well. The mobile station 206 searches for a suitable cell of the selected PLMN and chooses that cell to provide available services, and tunes to its control channel. This choosing is known as "camping on the cell." The mobile station 206 will, if necessary, then register its presence in the registration area of the chosen cell and as the outcome of a successful Location Registration the selected PLMN becomes the registered PLMN.

If the mobile station 206 finds a more suitable cell, the mobile station 206 reselects onto that cell and camps on it. If the new cell is in a different registration area, location registration is performed. If necessary, the mobile station 206 may search for higher priority PLMNs at regular time intervals and search for a suitable cell if another PLMN has been selected.

Figure 3A:
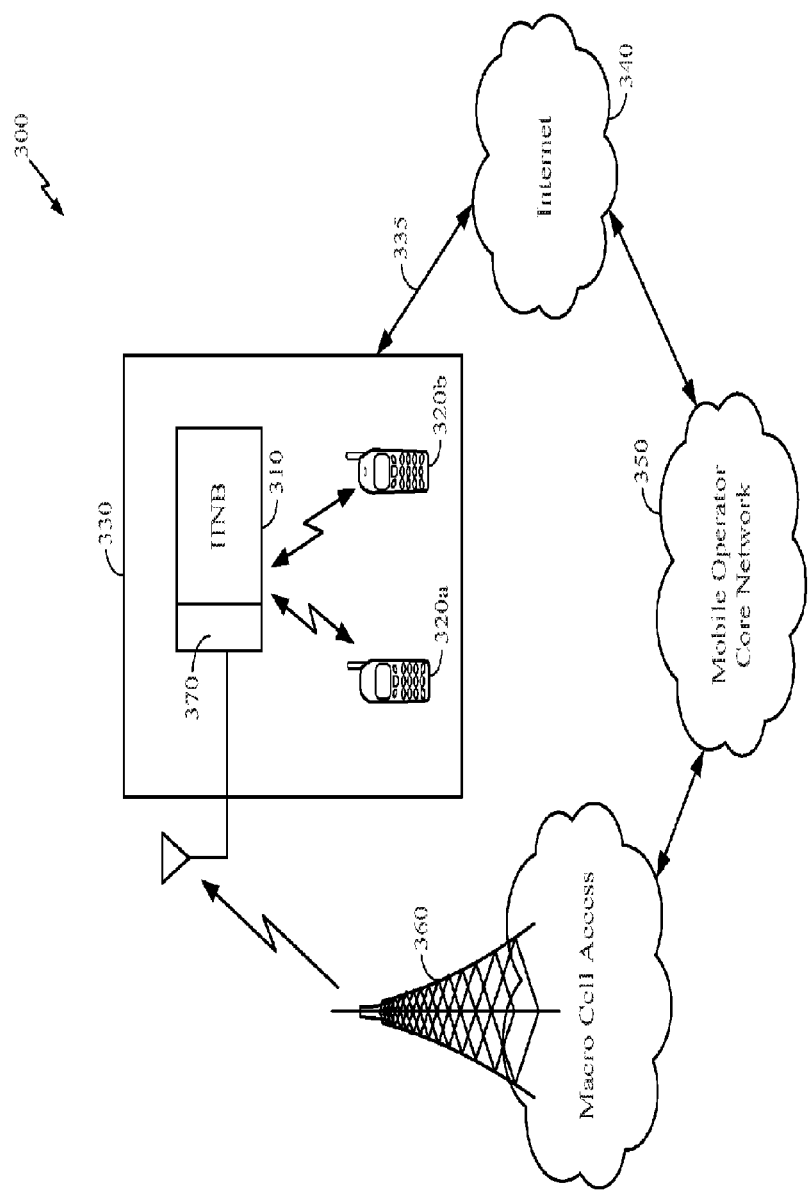
FIG. 3A illustrates a communication system to enable deployment of Home Node Bs (HNBs) within a network environment according to various embodiments of the disclosure.

FIG. 3A illustrates a communication system 300 to enable deployment of Home Node Bs (HNBs) within a network environment according to various embodiments of the disclosure, including (but not limited to) the embodiments of FIGS. 1, 2, and 3B-7. As shown in FIG. 3A, the system 300 includes a small cell device 310, such as a femtocell unit or other small-cell unit, such as a picocell unit, microcell unit, or the like, installed in a corresponding small scale network environment 330, such as, for example, in one or more user residences, and being configured to serve associated user equipment(s) (UE(s)) 320a, 320b, referred to as UE(s) 320. The femtocell unit 310 may be coupled to Internet 340 by way of a backhaul connection 335, for example, a cable or DSL connection. The femtocell unit 310 is further communicatively coupled to a mobile operator core network 350 via the Internet 340 utilizing suitable communication hardware and software. Further, the femtocell unit 310 may be communicatively coupled to one or more macrocell base stations 360. In particular embodiments, the femtocell unit may utilize a network listen component 370 for sniffing an air interface broadcasted by one or more of the macrocell base stations 360.

Although some of the embodiments described herein below use 3GPP terminology, it is to be understood that the embodiments may be applied to 3GPP technology, as well as 3GPP2 technology and other known and related technologies. In such embodiments described herein, the owner of the femtocell unit 310 subscribes to a mobile service, such as, for example, 3G or 4G-LTE mobile service from a provider, offered through the mobile operator core network 350, and the UE 320 may operate both in macrocellular environment and in a residential small-scale network environment 330. Thus, the femtocell unit 310 may be backward compatible with any existing UE 320.

Figure 3B:
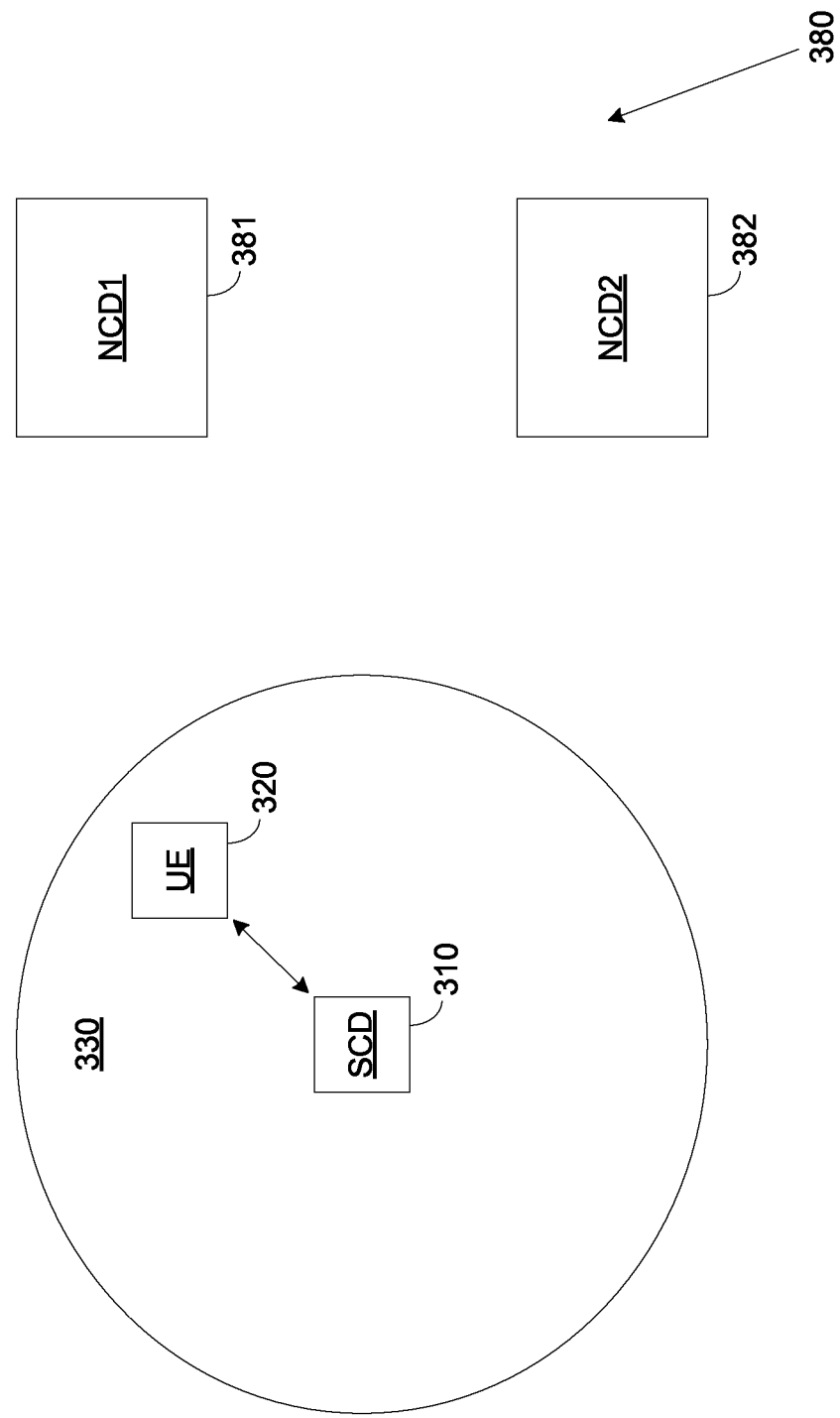
FIGS. 3B-3C illustrate network environments according to various embodiments of the disclosure.
Figure 3C:
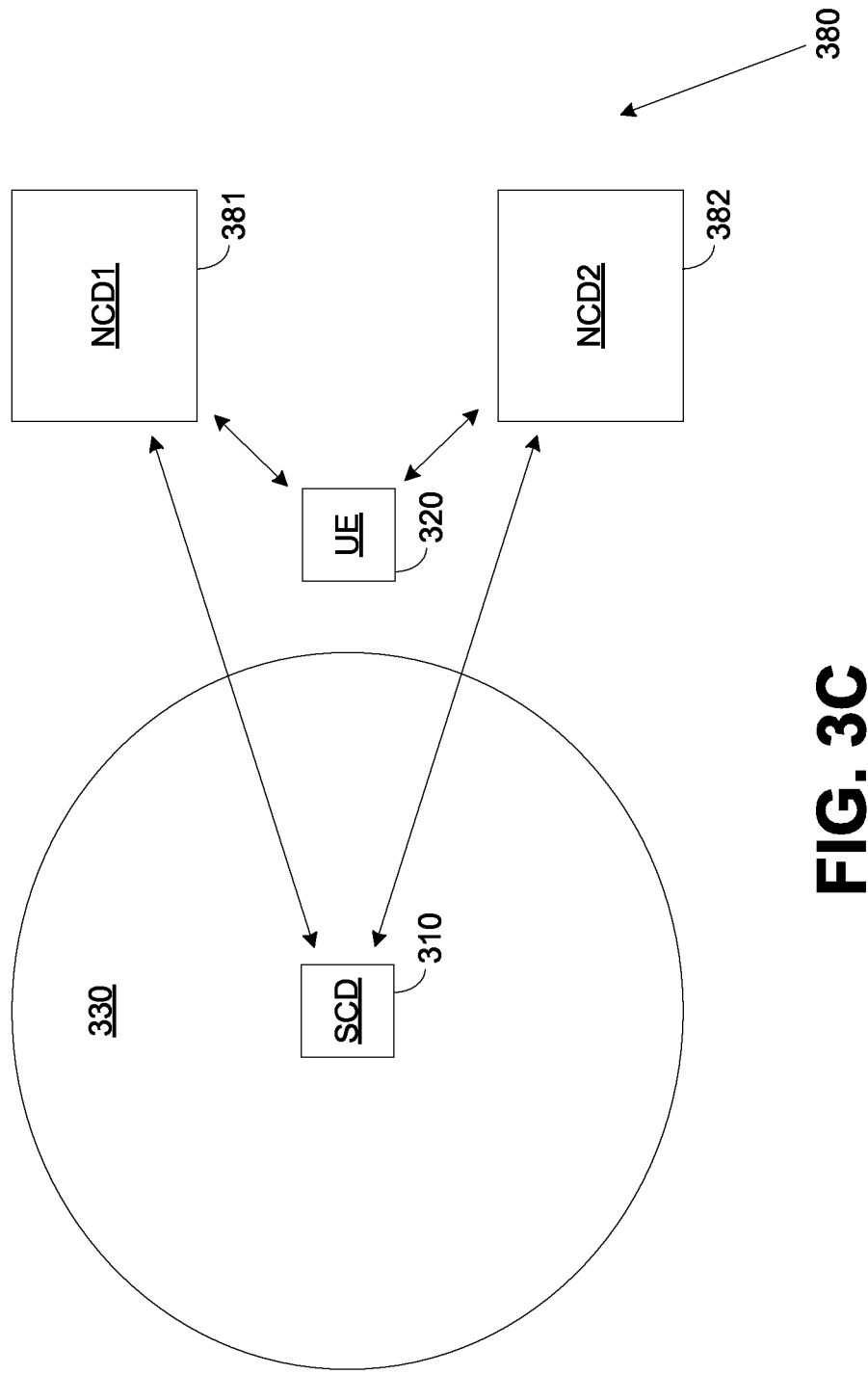

FIGS. 3B and 3C illustrate exemplary network environments. For example, in FIG. 3B, the UE 320 is in a coverage area (network environment) 330 of the small cell device (SCD) 310, thereby allowing communication between the devices. As another example, in FIG. 3C, the UE 320 is outside the coverage area 330 of the small cell device 310 or is otherwise unable to communicate with the UE 320 (e.g., the small cell device 310 is in a power-save mode having reduced transmission/receiving capabilities). In such embodiments, for example, the UE 320 may communicate with one or more neighboring cell devices (e.g., NCD1, NCD2) 380. One or more of the neighboring cell devices 380 may be a small cell device (e.g., femtocell unit, picocell unit, microcell unit, etc.). One or more of the neighboring cell devices 380 may be a macro base station (e.g., a macro base station, such as the mobile operator core network 350 in FIG. 3A).

Figure 4A:
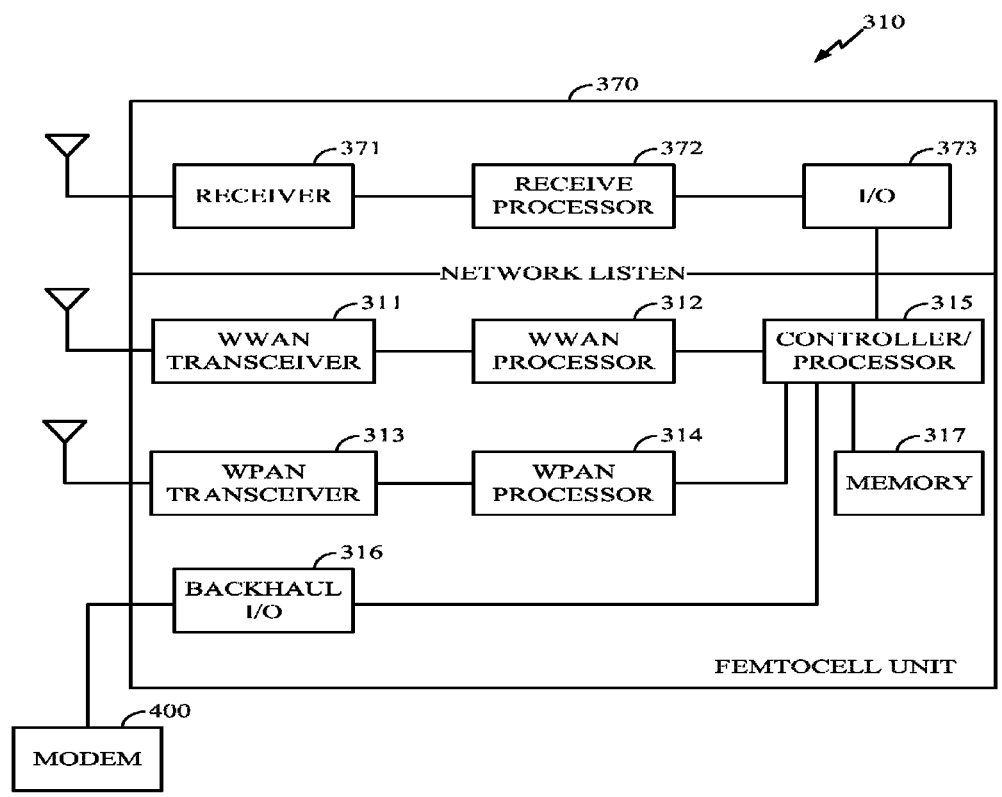
FIG. 4A-4B are block diagrams illustrating a small cell unit and a user equipment according to according to various embodiments of the disclosure.

FIG. 4A illustrates a small cell unit, such as the femtocell unit 310 according to according to various embodiments of the disclosure, including (but not limited to) the embodiments of FIGS. 1-3C and 4B-7. In FIG. 4A, a number of blocks are labeled as processors or controllers. Those skilled in the art will comprehend that each of these processors may be implemented as hardware processors such as the processor 104 (refer to FIG. 1) or the processing system 114 (refer to FIG. 1), or alternately, the functions performed by any number of the illustrated processors may be combined into and implemented by a single hardware processor. Further, the illustrated processors in FIG. 4A may represent functions to be implemented by processors, software, or the like.

With reference to FIGS. 1-4A, in various embodiments, the network listen component 370 may be for neighboring cell device discovery, interference management, mobility management, and/or the like. In particular embodiments, the network listen component 370 may be for configuring the femtocell unit 310 and retrieving timing and frequency information for synchronization. The network listen component 370 may include a downlink receiver 371 and a receive processor 372 for receiving and measuring signal and interference levels on various available channels. The network listen component 370 may further utilize the receiver 371 and the receive processor 372 to acquire timing and frequency information from neighboring cells and decode broadcast messages from those cells for mobility and interference management purposes. For example, the network listen component 370 may achieve this by periodically scanning the surrounding cells. The femtocell unit 310 may further include wireless wide area network (WWAN) components including a wireless wide area network (WWAN) transceiver 311 and a WWAN processor 312, and wireless personal area network (WPAN) components including a WPAN transceiver 313 and a WPAN processor 314. Here, the WPAN components are optional, and may be utilized for low-power, out-of-band communication with a UE in proximity to the femtocell unit 310. The femtocell unit 310 may further include a backhaul I/O unit 316 for facilitating communication with a modem 400, which may be internal or external to the femtocell unit 310, a controller/processor 315 for controlling and coordinating the various functionalities of the femtocell unit 310, and a memory 317 for storing information for utilization by the controller/processor 315.

Figure 4B:
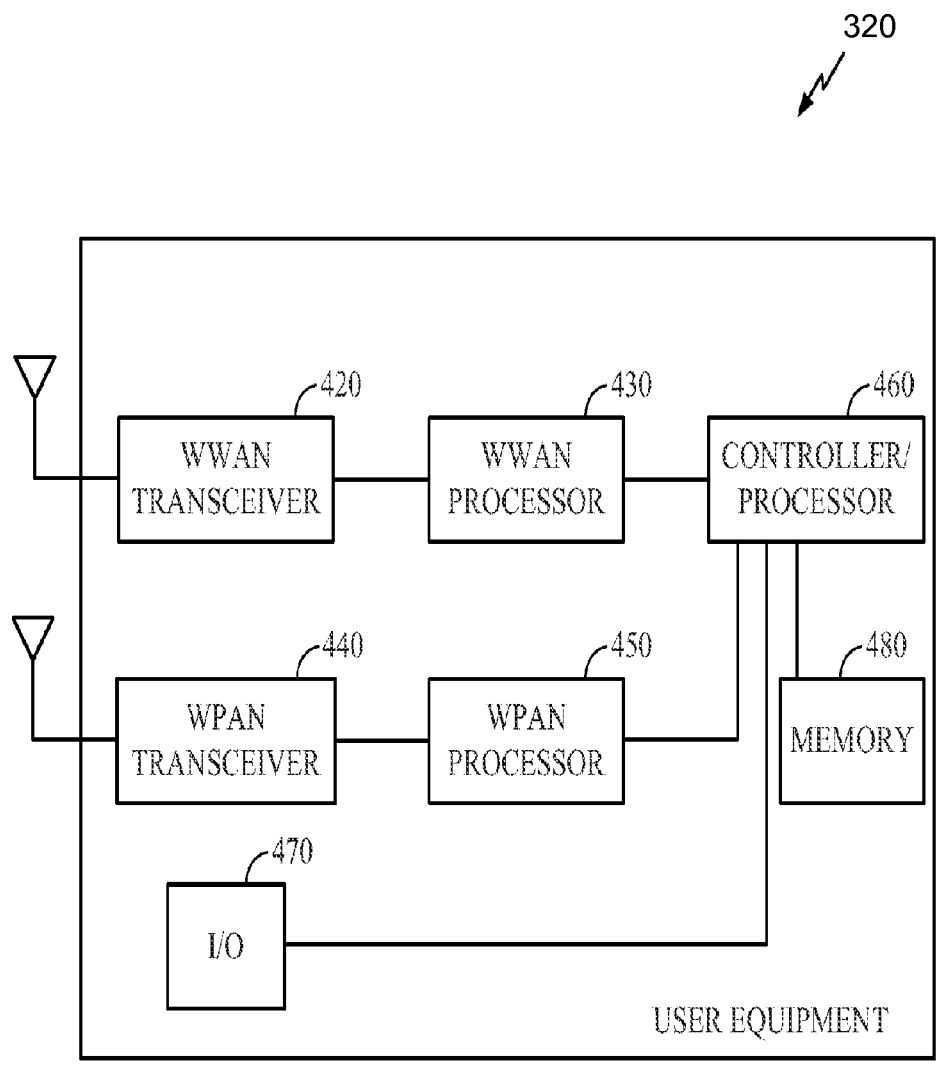

FIG. 4B illustrates a user equipment, such as the UE(s) 320 (according to according to various embodiments of the disclosure, including (but not limited to) the embodiments of FIGS. 1-4A and 5-7. In FIG. 4B, a number of blocks are labeled as processors or controllers. Those skilled in the art will comprehend that each of these processors may be implemented as hardware processors such as the processor 104 (refer to FIG. 1) or the processing system 114 (refer to FIG. 1), or alternately, the functions performed by any number of the illustrated processors may be combined into and implemented by a single hardware processor. Further, the illustrated processors in FIG. 4B may represent functions to be implemented by processors, software, or the like.

With reference to FIGS. 1-4B, the UE 320 may include a WWAN transceiver 420 and WWAN processor 430. The UE 320 may include a WPAN transceiver 440 and a WPAN processor 450. Accordingly, the UE 320 may be configured to establish a WWAN link and/or a WPAN link with the femtocell unit 310. Further, the UE 320 may include an I/O 470 for accepting user input, for example, from a keypad (not illustrated) and providing output, for example, to a display (not illustrated). Further, the UE 320 may include a controller/processor 460 for controlling the various functions of the UE 320, and a memory 480 for storing information for use by the controller/processor 460.

In various embodiments, operation of the femtocell unit 310 (or other small cell device) is controlled based on a proximity indication by the UE 320, for example, through a periodic beacon transmitted by the UE 320. In general, the femtocell unit 310 is in a power-save mode (or low power mode) when the UE 320 is not in the coverage area of the femtocell unit 310. When the UE 320 is in proximity of the femtocell unit 310, the femtocell unit 310 may detect the beacon (or be notified by a neighboring cell device that the beacon has been detected), enter a high-power mode, and serve the UE 320. By having the UE 320 transmit the beacons, the femtocell unit 310 may remain in the power-save mode until the beacons are detected. This is in contrast to conventional systems in which the femtocell unit 310 remains in the high-power mode (i.e., remains on) and transmits beacons to the UE 320 for detection by the UE 320.

In particular embodiments, RACH preambles (or RACH messages) may be implemented as beacons. Such embodiments are advantageous in that existing signaling mechanisms (RACH preambles and messages) are being reused for the purpose of proximity detection (beaconing).

Figure 5A:
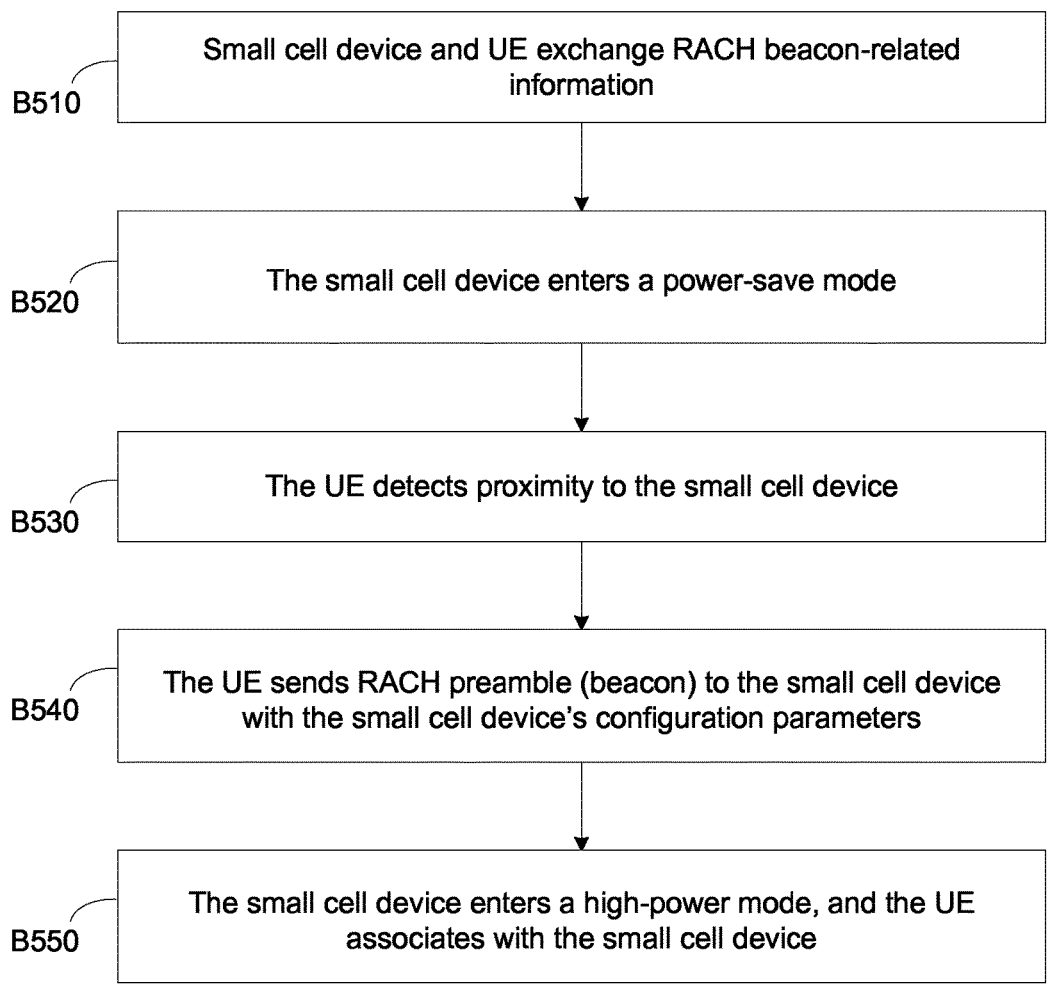
FIGS. 5A-5B illustrate a method according to various embodiments of the disclosure.

FIG. 5A illustrates a method of beacon detection B500 according to various embodiments of the disclosure. With reference to FIGS. 1-5A, the method B500 may be implemented by one or more of the small cell device 310 and/or the UE 320 (e.g., in the processing system 100 of the small cell device 310 and/or the UE 320).

At block B510, the small cell device 310 and the UE 320 exchange RACH beacon-related information (e.g., refer to FIG. 3B). There are several parameters transmitted from the small cell device 310 to the UE 320 in broadcast messages (e.g., in a system information block type 5 (SIB5) message in UMTS). The parameters are used by the UE 320 to send RACH preambles and RACH messages to the small cell device 310. The parameters may include one or more of (but are not limited to) access slots, preamble scramble codes, preamble signatures, spreading factor for data part, available signatures and sub-channels for each Access Service Class (ASC), power control information, etc.

At block B520, the small cell device 310 goes into a power-save mode (or first mode or low power mode), for instance, when the UE 320 is no longer in a coverage area of the small cell device 310. In the power-save mode, a RACH sniffing module, such as the network listening component 370, of the small cell device 310 remains activated to receive or otherwise detect a RACH beacon (e.g., RACH preamble). In the power-save mode, other forms of reception and/or transmission may be disabled.

At block B530, upon, for example, reentering the coverage area of the small cell device 310, the UE 320 may detect proximity to the small cell device 310 via a neighborhood map or any other suitable manner for detecting the small cell device 310 (e.g., out-of-band (OOB) signaling, position estimation, etc.).

At block B540, for instance in response to the proximity detection of the small cell device 310, the UE 320 sends a RACH preamble (beacon) to the small cell device 310 with the beacon-related information exchanged at block B510. The UE 320 may send the RACH preamble designated for beaconing, for instance, without detecting a downlink pilot signal from the small cell device 310.

At block B550, for instance in response to receiving the beacon, the small cell device 310 enters a high-power mode (or second mode), and the UE 320 associates with the small cell device 310. After the small cell device 310 enters the high-power mode, a subsequent RACH procedure may be initiated to complete cell reselection.

Figure 5B:
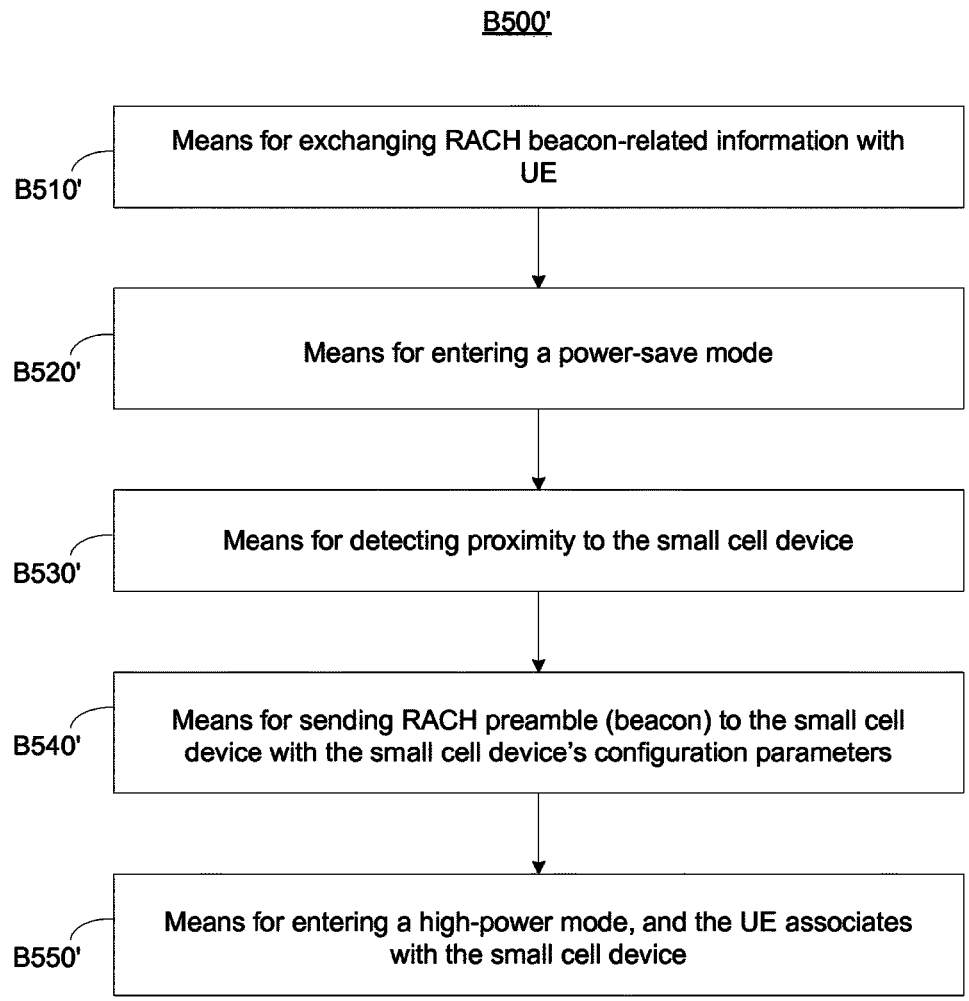

The method B500 described in FIG. 5A above may be performed by various hardware and/or software component(s) and/or module(s) corresponding to the means-plus-function blocks B500' illustrated in FIG. 5B. In other words, blocks B510 through B540 illustrated in FIG. 5A correspond to means-plus-function blocks B510' through B540' illustrated in FIG. 5B.

Figure 6A:
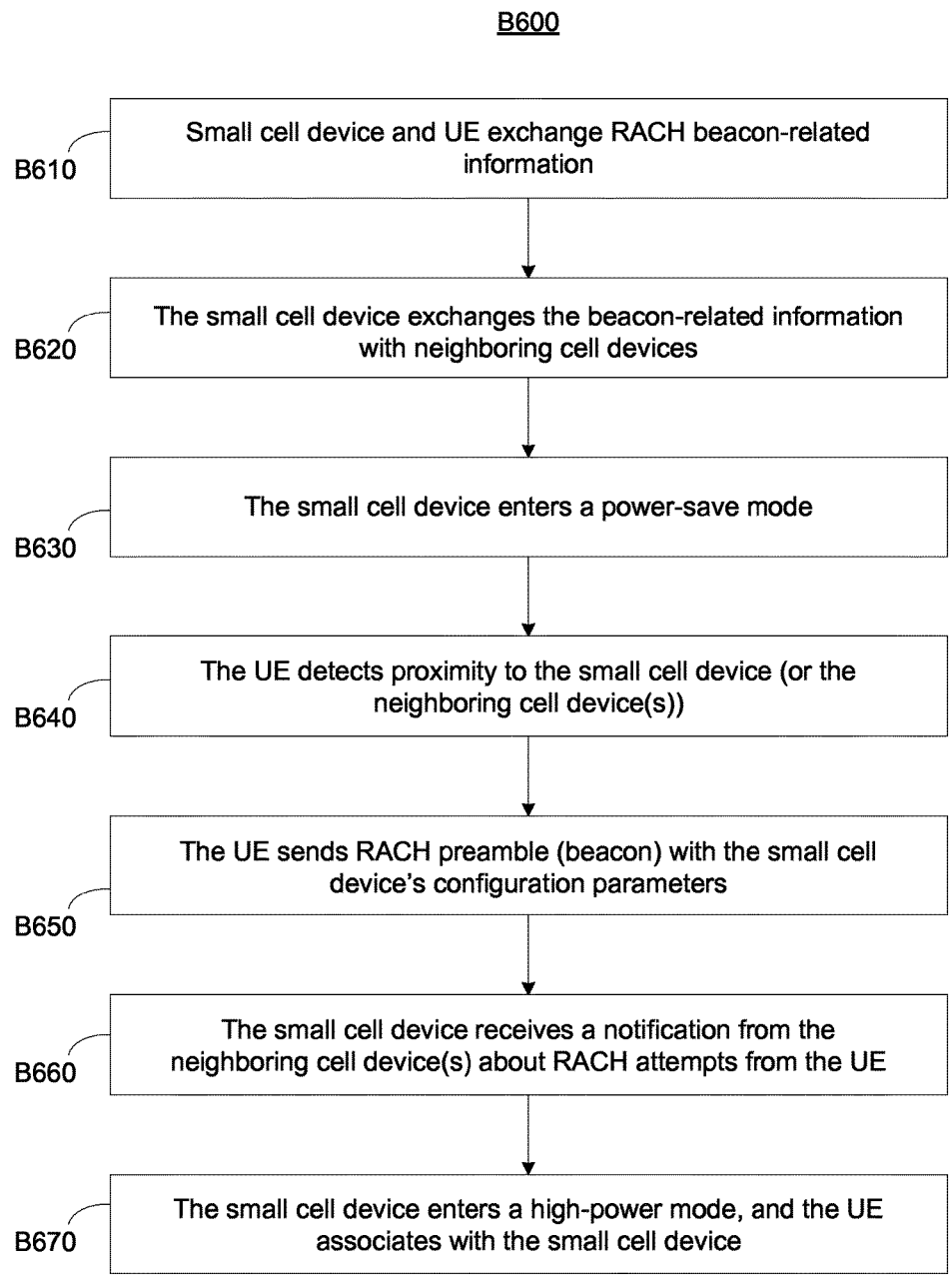
FIGS. 6A-6B illustrate a method according to various embodiments of the disclosure.

FIG. 6A illustrates a method of beacon detection B600 according to various embodiments of the disclosure. With reference to FIGS. 1-6A, the method B600 may be implemented by one or more of the small cell device 310 and/or the UE 320 (e.g., in the processing system 100 of the small cell device 310 and/or the UE 320).

At block B610, the small cell device 310 and the UE 320 exchange RACH beacon-related information (e.g., refer to FIG. 3B). There are several parameters transmitted from the small cell device 310 to the UE 320 in broadcast messages (e.g., in SIB5 message in UMTS). The parameters are used by the UE 320 to send RACH preambles and RACH messages to the small cell device 310. The parameters may include (but are not limited to) access slots, preamble scramble code, preamble signatures, spreading factor for data part, available signatures and sub-channels for each Access Service Class (ASC), power control information, etc.

At block B620, the small cell device 310 exchanges the beacon-related information with one or more of the neighboring cell devices 380. In addition, the small cell device 310 may notify the neighboring cell devices 380 that the small cell device 310 is transitioning to a power-save mode.

At block B630, the small cell device 310 goes into the power-save mode (or first mode or low power mode), for instance, when the UE 320 is no longer in a coverage area of the small cell device 310 (e.g., refer to FIG. 3C). In some embodiments, while in the power-save mode, the neighboring cell devices 380 may perform RACH sniffing (e.g., via respective network listening components 370) to detect the UE 320 identified in the beacon-related information. In some embodiments, in the power-save mode, the small cell device 310 may continue operating the network listening component 370 to receive or otherwise detect a notification from the neighboring cell devices 380. In the power-save mode, other forms of reception and/or transmission may be disabled. In other embodiments, the small cell device 310 may receive the notification via the backhaul 335 or the like.

At block B640, upon, for example, reentering the coverage area 330 of the small cell device 310 or the coverage area of the neighboring cell devices 380 (e.g., refer to FIG. 3C), the UE 320 may detect proximity to the small cell device 310 and/or the neighboring cell devices 380 via a neighborhood map or any other suitable manner for detecting the small cell device 310 (e.g., out-of-band (OOB) signaling, position estimation, etc.).

At block B650, for instance in response to the proximity detection, the UE 320 transmits a RACH preamble (beacon) with the beacon-related information exchanged between the UE 320 and the small cell device 310 at block B610, which was also exchanged between the small cell device 310 and the neighboring cell devices 380 at block B620. For instance, the RACH may be for uplink data transmission, cell update, RRC connection request, and/or the like.

At block B660, for instance in response to detection of the beacon from the UE 320, one or more of the neighboring cell devices 380 notifies the small cell device 310.

At block B670, for instance in response to receiving the notification, the small cell device 310 enters a high-power mode (or second mode), and the UE 320 associates with the small cell device 310. After the small cell device 310 enters the high-power mode, a subsequent RACH procedure may be initiated to complete cell reselection.

Because such embodiments include multiple small cell devices performing RACH sniffing, probability of detecting presence of the UE 320 increases. In addition, an area over which the presence of the UE 320 can be detected is increased. As a result, the presence of the UE 320 can be detected earlier, allowing the small cell device 310 to enter the high-power mode earlier. Accordingly, by the time the UE 320 enters the coverage of the small cell device 310, the small cell device 310 may have entered the high-power mode and started transmitting overhead channels for detection and reselection by the UE, thus lowering handover latency.

Figure 6B:
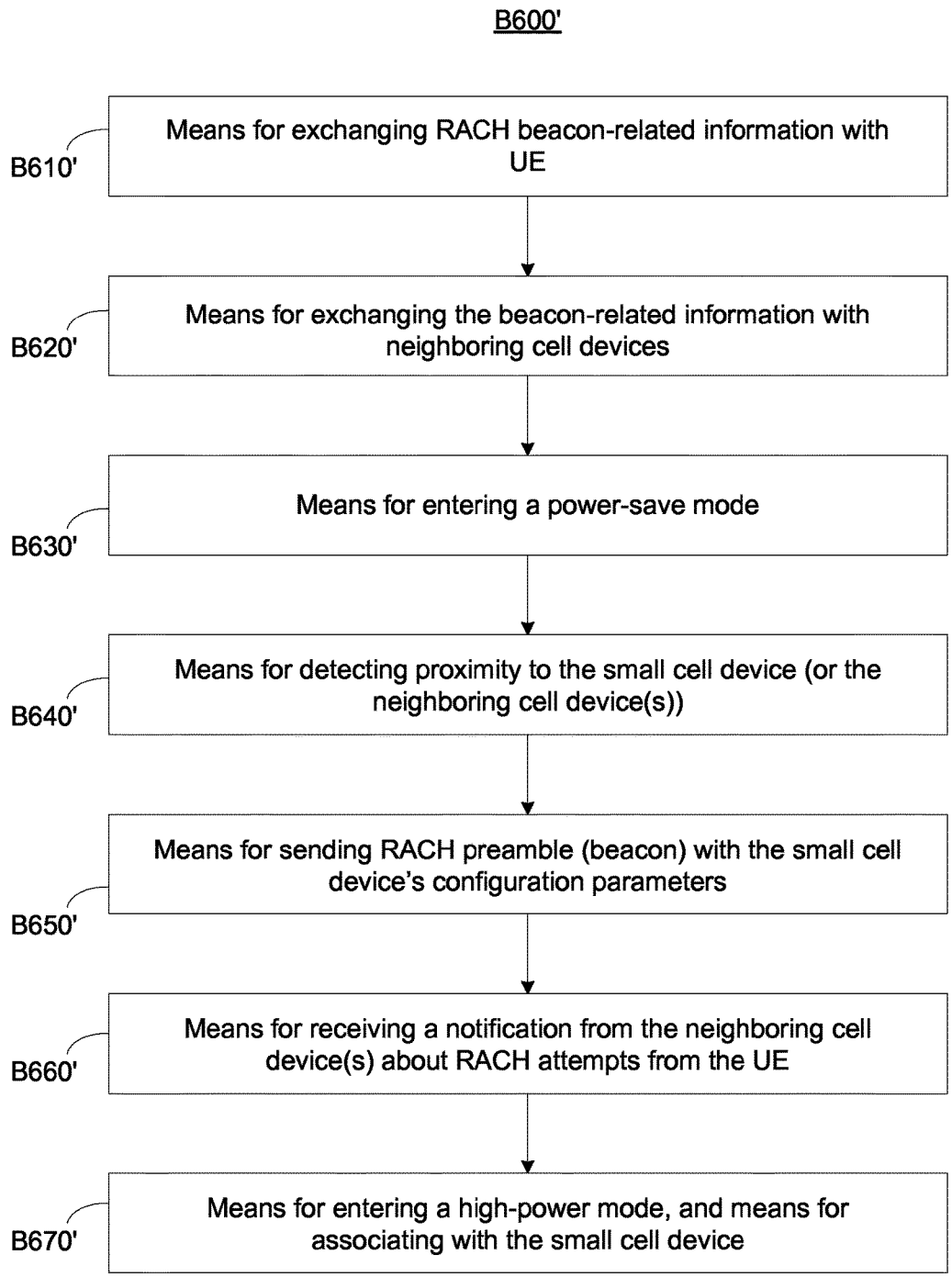

The method B600 described in FIG. 6A above may be performed by various hardware and/or software component(s) and/or module(s) corresponding to the means-plus-function blocks B600' illustrated in FIG. 6B. In other words, blocks B610 through B640 illustrated in FIG. 6A correspond to means-plus-function blocks B610' through B640' illustrated in FIG. 6B.

Figure 7:
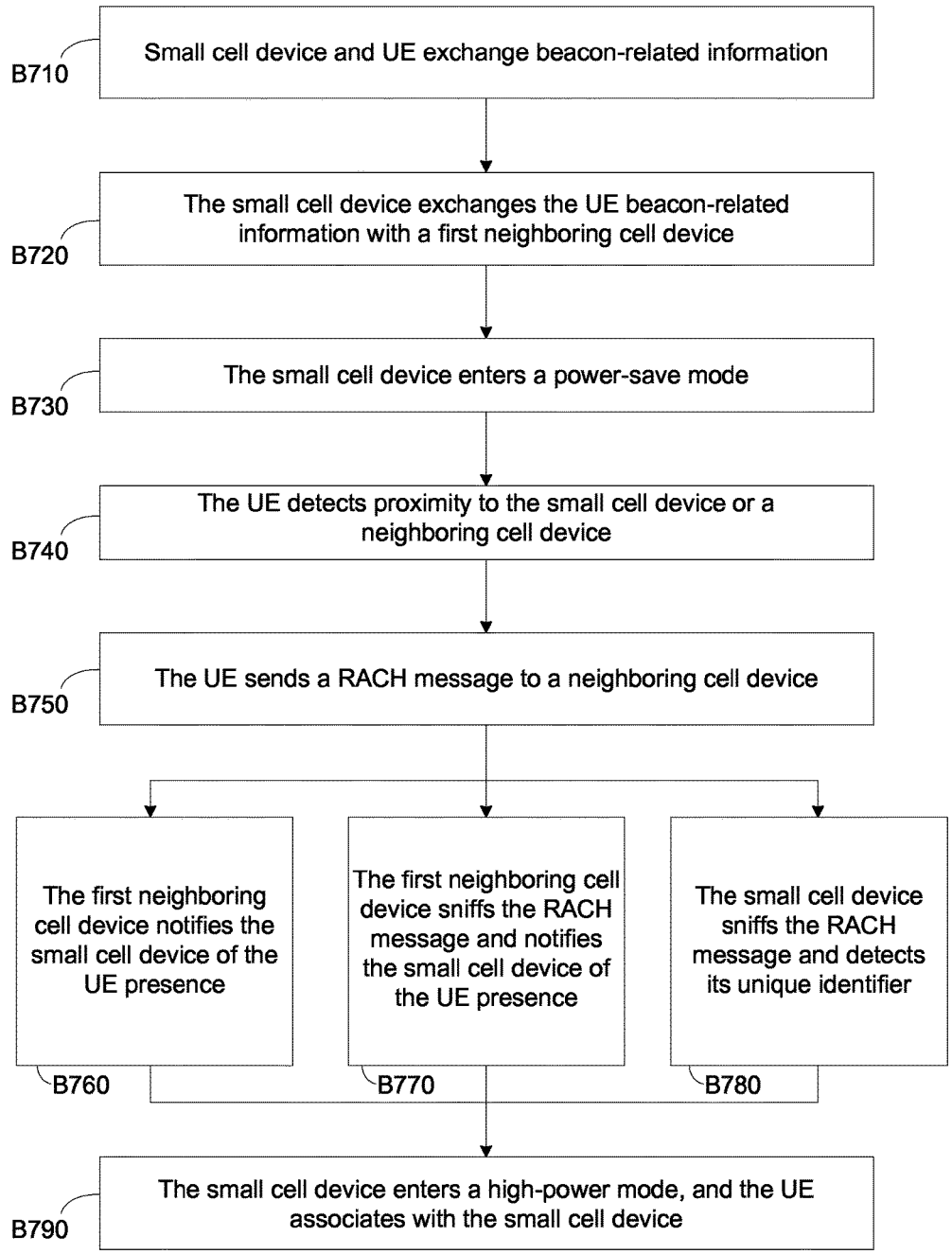
FIG. 7 illustrates a method according to various embodiments of the disclosure.

With reference to FIGS. 1-7, in various embodiments, a beacon-detection method may include the UE 320 transmitting a RACH message as a beacon. The RACH message may be received by one or more of the neighboring cell devices 380. FIG. 7 illustrates such a method of beacon detection B700 according to various embodiments of the disclosure. With reference to FIGS. 1-7, the method B700 may be implemented by one or more of the small cell device 310 and/or the UE 320 (e.g., in the processing system 100 of the small cell device 310 and/or the UE 320).

At block B710, the small cell device 310 and the UE 320 exchange RACH beacon-related information (e.g., refer to FIG. 3B). There are several parameters transmitted from the small cell device 310 to the UE 320 in broadcast messages (e.g., in SIB5 message in UMTS). The parameters are used by the UE 320 to send RACH preambles and RACH messages to the small cell device 310. The parameters may include (but are not limited to) access slots, preamble scramble code, preamble signatures, spreading factor for data part, available signatures and sub-channels for each Access Service Class (ASC), power control information, etc.

At block B720, the small cell device 310 exchanges the beacon-related information with one or more of the neighboring cell devices 380. In addition, the small cell device 310 may notify the neighboring cell devices 380 that the small cell device 310 is transitioning to a power-save mode. The neighboring cell devices 380, for example, may include a first neighboring cell device 381. In some embodiments, at least one of the neighboring cell devices 380 may include a second neighboring cell device 382 that did not exchange the beacon-related information with the small cell device 310 or is otherwise not implementing the cooperative method B700.

The small cell device 310 may share this information with the neighboring cell devices 380 during neighbor discovery. For instance, in some embodiments, the small cell device 310 may inform the neighboring cell devices 380 that the small cell device 310 of its intent to participate in the method of B700 (or the like) via a pre-defined field in its cell broadcast information. In another embodiment, the small cell device 310, before going into the power-save mode, may send inquiries to all or a subset of the neighboring cell devices 380 about their intent to participate in such a method.

At block B730, the small cell device 310 goes into a power-save mode (or first mode), for instance, when the UE 320 is no longer in the coverage area 330 of the small cell device 310. In some embodiments, while in the power-save mode, one or more of the neighboring cell devices 380 may perform RACH sniffing (e.g., via respective network listening components 370) to detect the UE 320. In some embodiments, in the power-save mode, the small cell device 310 may continue operating the network listening component 370 to receive or otherwise detect a RACH beacon (e.g., RACH message) and/or a notification from the other small cell devices. In the power-save mode, other forms of reception and/or transmission may be disabled. In other embodiments, the small cell device 310 may receive the notification via the backhaul 335 or the like.

At block B740, upon, for example, reentering the coverage area of the small cell device 310 or the coverage area of the neighboring cell devices 380, the UE 320 may detect proximity to the small cell device 310 and/or the neighboring cell devices 380 via a neighborhood map or any other suitable manner for detecting the small cell device 310 (e.g., out-of-band (OOB) signaling, position estimation, etc.).

At block B750, for instance in response to the proximity detection, the UE 320 sends a RACH message to at least one of the neighboring cell devices 380, such as the first neighboring cell device 381. For example, the UE 320 may send the RACH message to the neighboring cell device 380 with which the UE 320 is currently associated (e.g., the first neighboring cell device 381).

The RACH message may be a cell update message with a unique identifier of the small cell device 310 or the like. For example, the unique identifier may be a serving radio network control identifier (SRNC-ID) in UTRAN Radio Network Temporary Identifier (U-RNTI).

In some embodiments, at block B760, for instance in response to receiving the RACH message (beacon) from the UE 320, the first neighboring cell device 381 notifies the small cell device 310 (based on the unique identifier in the RACH message) of the presence of the UE 320. This may occur, for example, if the neighboring cell device (e.g., the first neighboring cell device 381) to which to UE 320 sends the RACH message (e.g., as in block B750) is implementing the cooperative method B700 (e.g., as in block B720). Accordingly, the first neighboring cell device 381, for example, may request the small cell device 310 to enter a high-power mode.

In other embodiments, at block B770, for instance in response to sniffing the RACH message (beacon) from the UE 320, the first neighboring cell device 381 notifies the small cell device 310 (based on the unique identifier in the RACH message) of the presence of the UE 320. This may occur, for example, if the neighboring cell device (e.g., the second neighboring cell device 382) to which to UE 320 sends the RACH message (e.g., as in block B750) is not is implementing the cooperative method B700 (e.g., as in block B720). The second neighboring cell device 382 may reject the RACH message from the UE 320, but the first neighboring cell device 381 may sniff the RACH message. Accordingly, the first neighboring cell device 382, for example, may request the small cell device 310 to enter a high-power mode.

In yet other embodiments, at block B780, the small cell device 310 may sniff the RACH message, for example via the network listening component 370, and detect its unique identifier, such as the SRNC-ID or the like. This may occur, for example, if the neighboring cell device (e.g., the second neighboring cell device 382) to which to UE 320 sends the RACH message (e.g., as in block B750) is not is implementing the cooperative method B700 (e.g., as in block B720). The second neighboring cell device 382 may reject the RACH message from the UE 320, but the small cell device 310 may sniff the RACH message.

At block B790, for instance in response to receiving the notification (e.g., block B760 or block B770) or sniffing the RACH message (e.g., block B780), the small cell device 310 enters the high-power mode. Accordingly, the UE 320 may associate with the small cell device 310.

Because such embodiments include multiple small cell devices performing RACH sniffing, probability of detecting presence of the UE 320 increases. In addition, an area over which the presence of the UE 320 can be detected is increased. As a result, the presence of the UE 320 can be detected earlier, allowing the small cell device 310 to enter the high-power mode earlier. Accordingly, by the time the UE 320 enters the coverage of the small cell device 310, the small cell device 310 may have entered the high-power mode and started transmitting overhead channels for detection and reselection by the UE, thus lowering system latency.

In various embodiments, the small cell device 310 and the UE 320 may select a subset of the parameters to use as part of the beaconing method (e.g., B500, B600, B700, etc.). For instance, in particular embodiments, the small cell device 310 and the UE 320 may select a subset of preamble signatures for use as beaconing. Typically, in UMTS, a UE may choose one of sixteen preamble signatures during preamble transmission. However, in some embodiments, the UE may choose from fifteen preamble signatures and select one (or other number of) preamble signature for beaconing purposes only. Accordingly, when in a power-save mode (as discussed in the disclosure), the small cell device 310 need only search for the selected preamble signature and not the other fifteen preamble signatures.

In various embodiments, the small cell device 310 and/or one or more of the neighboring cell devices 380 are configured to coordinate a schedule for allowing the cell devices to enter power-save mode.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method comprising:
   transmitting beacon parameters to a user equipment (UE), wherein the beacon parameters comprise power control information for a random access channel (RACH) preamble associated with a small cell device;
   entering, by the small cell device, a low power mode after the beacon parameters have been transmitted to the UE;
   receiving, from the UE, while the small cell device is in the low power mode, a beacon comprising the RACH preamble generated according to the beacon parameters;
   entering a high power mode in response to receiving the beacon; and
   associating with the UE while in the high power mode.

2. The method of claim 1, wherein the beacon parameters are transmitted to the user equipment while the small cell device is in the high power mode.

3. The method of claim 1, wherein:
   in the low power mode, a listening component of the small cell device for receiving the beacon is activated and a transceiver of the small cell device for receiving data packets is deactivated; and
   in the high power mode, the listening component of the small cell device is activated and the transceiver of the small cell device is activated.

4. The method of claim 1, wherein the small cell device enters the low power mode when the UE is not in coverage of the small cell device.

5. The method of claim 1, wherein the small cell device is a femtocell unit.

6. The method of claim 1, wherein the associating comprises performing a subsequent RACH procedure to complete cell reselection.

7. A method performed by a user equipment, comprising:
   receiving beacon parameters, wherein the beacon parameters comprise power control information for a random access channel (RACH) preamble associated with a small cell device;
   detecting a proximity of the small cell device;
   transmitting to the small cell device, in response to the detecting, a beacon comprising the RACH preamble generated according to the beacon parameters; and
   associating with the small cell device.

8. The method of claim 7, wherein:
   the proximity of the small cell device is detected while the small cell device is in a low power mode; and
   the user equipment associates with the small cell device while the small cell device is in the high power mode.

9. The method of claim 7, wherein the associating comprises performing a subsequent RACH procedure to complete cell reselection.

10. The method of claim 7, wherein the proximity of the small cell device is detected via out-of-band signaling.

11. A method comprising:
    transmitting beacon parameters to a user equipment (UE), wherein the beacon parameters comprise power control information for a random access channel (RACH) preamble associated with a small cell device;
    entering a low power mode after the beacon parameters have been transmitted to the UE;
    receiving, while in the low power mode, a notification from a neighboring cell device in response to the neighboring cell device receiving, from the UE, a beacon comprising the RACH preamble generated according to the beacon parameters;
    entering a high power mode in response to receiving the notification; and
    associating with the UE while in the high power mode.

12. The method of claim 11, wherein the neighboring cell device comprises a second small cell device.

13. The method of claim 11, wherein the neighboring cell device comprises a macro cell device.

14. The method of claim 11, wherein the notification is received via a backhaul to the small cell device.

15. The method of claim 11, wherein the beacon parameters are transmitted to the UE while the small cell device is in the high power mode.

16. The method of claim 11, wherein:
    in the low power mode, a listening component of the small cell device for receiving the notification is activated and a transceiver of the small cell device for receiving data packets is deactivated; and
    in the high power mode, the listening component of the small cell device is activated and the transceiver of the small cell device is activated.

17. The method of claim 11, wherein the small cell device enters the low power mode when the UE is not in coverage of the small cell device.

18. The method of claim 11, wherein the small cell device is a femtocell unit.

19. The method of claim 11, wherein the associating comprises performing a subsequent RACH procedure to complete cell reselection.

20. A method performed by a user equipment, comprising:
    receiving beacon parameters by the user equipment, wherein the beacon parameters comprise power control information for a random access channel (RACH) preamble associated with a small cell device;
    detecting a proximity of a neighboring cell device associated with the small cell device;
    transmitting, to the neighboring cell device in response to the detecting, a beacon comprising the RACH preamble generated according to the beacon parameters; and
    associating with the small cell device.

21. The method of claim 20, wherein:
the proximity of the neighboring cell device is detected while the small cell device is in a low power mode; and
the user equipment associates with the small cell device while the small cell device is in the high power mode.

22. The method of claim 20, wherein the associating comprises performing a subsequent RACH procedure to complete cell reselection.

23. The method of claim 20, wherein the proximity of the neighboring cell device is detected via out-of-band signaling.

24. A method comprising:
transmitting beacon parameters to a user equipment (UE), wherein the beacon parameters comprise power control information for a random access channel (RACH) preamble associated with a small cell device;
entering, by the small cell device, a low power mode after the beacon parameters have been transmitted to the UE;
receiving, while in the low power mode, at least one of (i) a beacon comprising the RACH message identifying the small cell device from the UE, or (ii) a notification from a neighboring cell device in response to the neighboring cell device detecting the beacon comprising the RACH message identifying the small cell device from the UE;
entering a high power mode in response to receiving the at least one of the beacon or the notification; and
associating with the UE while in the high power mode.

25. The method of claim 24, wherein the RACH message includes an identifier for the small cell device.

26. The method of claim 25, wherein the identifier comprises a serving radio network control identifier (SRNC-ID).

27. The method of claim 24, wherein the notification is received from the neighboring cell device to which the UE transmitted the RACH message.

28. The method of claim 24, wherein the notification is received from a different neighboring cell device to which the UE transmitted the RACH message.

29. The method of claim 24, wherein the neighboring cell device comprises a second small cell device.

30. The method of claim 24, wherein the neighboring cell device comprises a macro cell device.

31. The method of claim 24, wherein the notification is received via a backhaul to the small cell device.

32. The method of claim 24, wherein the beacon parameters are transmitted to the UE while the small cell device is in the high power mode.

33. A method of beacon transmission performed by a user equipment, comprising:
receiving beacon parameters, wherein the beacon parameters comprise power control information for a random access channel (RACH) preamble associated with a small cell device;
detecting a proximity of a neighboring cell device;
transmitting, in response to detecting the neighboring cell device, a beacon comprising a random access channel (RACH) message generated according to the beacon parameters; and
associating with the small cell device.

34. The method of claim 33, wherein the RACH message is transmitted to the detected neighboring cell device.

35. The method of claim 33, wherein the RACH message includes an identifier for the small cell device.

36. The method of claim 33, wherein the identifier comprises a serving radio network control identifier (SRNC-ID).

37. The method of claim 33, wherein:
the proximity of the neighboring cell device is detected while the small cell device is in a low power mode; and
the user equipment associates with the small cell device while the small cell device is in the high power mode.

38. The method of claim 33, wherein the associating comprises performing a subsequent RACH procedure to complete cell reselection.

39. The method of claim 33, wherein the proximity of the neighboring cell device is detected via out-of-band signaling.

40. An apparatus comprising:
means for transmitting beacon parameters to a user equipment (UE), wherein the beacon parameters comprise power control information for a random access channel (RACH) preamble associated with a small cell device,
the means for transmitting entering a low power mode for the small cell device after the beacon parameters have been transmitted to the UE;
means for receiving, from the UE, while the small cell device is in the low power mode, a beacon comprising the RACH preamble generated according to the beacon parameter,
the means for transmitting entering a high power mode for the small cell device in response to receiving the beacon; and
means for associating with the UE while the small cell device is in the high power mode.

41. An apparatus comprising:
a transmitter;
a receiver; and
a processor and memory configured for:
transmitting, via the transmitter, beacon parameters to a user equipment (UE), wherein the beacon parameters comprise power control information for a random access channel (RACH) preamble associated with a small cell device;
entering, by the small cell device, a low power mode after the beacon parameters have been transmitted to the UE;
receiving, from the UE via the receiver and while the small cell device is in the low power mode, a beacon comprising the RACH preamble generated according to the beacon parameters;
entering a high power mode in response to receiving the beacon; and
associating with the UE while in the high power mode.

42. A non-transitory computer-readable medium storing computer-executable code for beacon detection, the code executable by a processor for:
transmitting beacon parameters to a user equipment (UE), wherein the beacon parameters comprise power control information for a random access channel (RACH) preamble associated with a small cell device;
entering, by the small cell device, a low power mode after the beacon parameters have been transmitted to the UE;
receiving, from the UE, while the small cell device is in the low power mode, a beacon comprising the RACH preamble generated according to the beacon parameters;
entering a high power mode in response to receiving the beacon; and
associating with the UE while in the high power mode.

43. The method of claim 1, wherein, in the low power mode, a RACH sniffing module of the small cell device remains active for detecting the beacon.

44. The method of claim 1, wherein transmitting the beacon parameters comprises transmitting the beacon parameters in a system information block type 5 (SIB5) message.

45. The method of claim 1, wherein transmitting the beacon parameters comprises transmitting one or more of access slots, preamble scramble codes, preamble signatures, spreading factor for data part, or available signatures and sub-channels for each Access Service Class (ASC).

46. The method of claim 1, wherein the beacon parameters comprise a subset of preamble signatures of the UE.

47. The method of claim 11, further comprising transmitting, by the small cell device, the beacon parameters to the neighboring cell device.

* * * * *